US012073978B2

(12) United States Patent
Nakabayashi et al.

(10) Patent No.: US 12,073,978 B2
(45) Date of Patent: Aug. 27, 2024

(54) COIL-EMBEDDED DUST CORE, INDUCTANCE ELEMENT, AND ELECTRIC OR ELECTRONIC DEVICE

(71) Applicant: Alps Alpine Co., Ltd., Tokyo (JP)

(72) Inventors: Ryo Nakabayashi, Niigata-ken (JP); Akinori Kojima, Niigata-ken (JP); Akira Sato, Niigata-ken (JP); Keiichiro Sato, Niigata-ken (JP); Masahiro Iizuka, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 848 days.

(21) Appl. No.: 17/081,644

(22) Filed: Oct. 27, 2020

(65) Prior Publication Data

US 2021/0074464 A1 Mar. 11, 2021

Related U.S. Application Data

(63) Continuation of application No. PCT/JP2019/011818, filed on Mar. 20, 2019.

(30) Foreign Application Priority Data

Jun. 15, 2018 (JP) ................................ 2018-114527

(51) Int. Cl.
*H01F 27/25* (2006.01)
*H01F 17/04* (2006.01)
(Continued)

(52) U.S. Cl.
CPC ........... *H01F 27/255* (2013.01); *H01F 17/04* (2013.01); *H01F 41/0246* (2013.01); *H01F 2017/046* (2013.01); *H01F 2017/048* (2013.01)

(58) Field of Classification Search
CPC .... H01F 27/255; H01F 17/04; H01F 41/0246; H01F 2017/046; H01F 2017/048
See application file for complete search history.

(56) References Cited

U.S. PATENT DOCUMENTS 9,959,965 B2 * 5/2018 Liu ...................... H01F 27/255
2016/0293321 A1 * 10/2016 Takeoka .................... H01F 1/14
(Continued)

FOREIGN PATENT DOCUMENTS

JP 2003-282342 10/2003
JP 2012-235051 11/2012

OTHER PUBLICATIONS

International Search Report from International Application No. PCT/JP2019/011818 dated Jun. 4, 2019.

*Primary Examiner* — Malcolm Barnes
(74) *Attorney, Agent, or Firm* — Beyer Law Group LLP

(57) ABSTRACT

In a coil-embedded dust core constituting an inductance element, a winding body of a coil disposed inside a coil-embedded dust core and a dust core have a relationship that the inner core volume ratio RV defined below is 3 or more and 5 or less: RV=(V1/V2)/(1−V/Vp), where V1 represents a volume of a region in the dust core located on an inner side of the winding body of the coil when the coil-embedded dust core is viewed in a first direction, which is a direction along a winding axis of the coil, V2 represents a volume of a region in the dust core located on an outer side of the winding body of the coil when the coil-embedded dust core is viewed in the first direction, V represents a volume of the dust core, and Vp represents a volume of the coil-embedded dust core.

9 Claims, 6 Drawing Sheets

(51) Int. Cl.
*H01F 27/255* (2006.01)
*H01F 41/02* (2006.01)

(56) References Cited

U.S. PATENT DOCUMENTS

| | | | | |
|---|---|---|---|---|
| 2017/0125158 | A1* | 5/2017 | Shoda | H01F 41/076 |
| 2017/0133143 | A1* | 5/2017 | Maeda | H01F 41/0246 |
| 2017/0243689 | A1* | 8/2017 | Yoon | H01F 17/04 |
| 2017/0309387 | A1 | 10/2017 | Nakabayashi et al. | |
| 2018/0021853 | A1* | 1/2018 | Takadate | B22F 1/102 336/233 |
| 2018/0096781 | A1* | 4/2018 | Sezai | H01F 27/28 |
| 2018/0182537 | A1* | 6/2018 | Shimizu | H01F 27/29 |
| 2018/0197674 | A1* | 7/2018 | Yoshinaka | H01F 27/2885 |
| 2018/0322998 | A1* | 11/2018 | Yamashita | H01F 41/04 |

* cited by examiner

COIL-EMBEDDED DUST CORE, INDUCTANCE ELEMENT, AND ELECTRIC OR ELECTRONIC DEVICE

CLAIM OF PRIORITY

This application is a Continuation of International Application No. PCT/JP2019/011818 filed on Mar. 20, 2019, which claims benefit of Japanese Patent Application No. 2018-114527 filed on Jun. 15, 2018. The entire contents of each application noted above are hereby incorporated by reference.

BACKGROUND OF THE INVENTION

1. Field of the Invention

The present invention relates to a coil-embedded dust core, an inductance element equipped with the coil-embedded dust core, and an electric or electronic device having the inductance element mounted thereto. In this description, the "inductance element" refers to a passive element equipped with a coil and a core material including a dust core, and encompasses the concept of a reactor.

2. Description of the Related Art

In recent years, from the viewpoint of achieving component downsizing, coil-embedded dust cores in which a coil is embedded in a dust core obtained by compacting a magnetic powder-containing material have been used. In a coil-embedded dust core described in Japanese Unexamined Patent Application Publication No. 2003-282342, the voltage between the core terminals and the relationship between the current and the volume of the core are regulated in order to prevent heat generation caused by the current flowing between the terminal electrodes of the coil. In a coil-embedded dust core described in Japanese Unexamined Patent Application Publication No. 2012-235051, it has been suggested that a portion of a dust core be formed of a material different from other portions in order to increase heat dissipation without degrading DC superposition characteristics.

Inductance elements equipped with the coil-embedded dust cores described in Japanese Unexamined Patent Application Publication Nos. 2003-282342 and 2012-235051 are abundantly used as components for driving the display units of portable communication terminals such as smart phones. There are a continuing demand for thickness reduction and size reduction of portable communication terminals and a continuing demand for improving the performance of display units, such as increasing the maximum display brightness. Under such demand, the inductance element is required to maintain its basic characteristics (especially L/DCR) as well as DC superposition characteristics despite size reduction (including height reduction). In order for an inductance element to obtain a particular self-inductance L, increasing the number of coil turns of a coil-embedded dust core in the inductance element is conceivable; however, since the basic premise of the inductance element is the downsizing, the volume of the coil-embedded dust core cannot be increased despite the increased number of coil turns. Consequently, the volume of the dust core in the coil-embedded dust core is to be relatively decreased. As a result, the DC superposition characteristics of the inductance element may be degraded. In particular, when the size of the coil-embedded dust core in the inductance element is about several square millimeters, there is substantially a limit to decreasing the coil volume in view of obtaining the self-inductance L desirable for the inductance element. Thus, it has been extremely difficult to obtain a coil-embedded dust core having improved DC superposition characteristics while securing the required self-inductance L.

SUMMARY OF THE INVENTION

The present invention provides a coil-embedded dust core that constitutes an inductance element capable of maintaining the basic characteristics (in particular, L/DCR) while improving the DC superposition characteristics. The present invention also provides an inductance element equipped with the coil-embedded dust core, and an electric or electronic device having the inductance element mounted thereto.

The inventors of the present invention have conducted studies to resolve the issue described above, and found that Isat×L/DCR, which is a comprehensive evaluation index for the basic characteristics and the DC superposition characteristics of the inductance element, can be stably increased by setting the shape of the winding body of a coil, which is disposed inside the coil-embedded dust core, in relation to the dust core.

The present invention has been conceived on the basis of such findings and provides the following:

An aspect of the present invention provides a coil-embedded dust core that includes a dust core containing a magnetic powder; and a coil having a winding body and being embedded in the dust core, in which the coil-embedded dust core has an inner core volume ratio RV of 3 or more and 5 or less as defined below:

$$RV=(V1/V2)/(1-V/Vp)$$

Here, V1 represents a volume (first volume) of a region (first region) in the dust core located on an inner side of the winding body of the coil when the coil-embedded dust core is viewed in a first direction, which is a direction along a winding axis of the coil, V2 represents a volume (second volume) of a region (second region) in the dust core located on an outer side of the winding body of the coil when the coil-embedded dust core is viewed in the first direction, V represents a volume (core volume) of the dust core, and Vp represents a volume (chip volume) of the coil-embedded dust core.

Since the magnetic flux generated by the current flowing in the coil flows in the first region, the larger the first volume V1 of the first region, the less likely the magnetic saturation of the coil-embedded dust core. Accordingly, the larger the first volume V1, the higher the self-inductance L (unit: μH) and Isat (current value at which the self-inductance L decreased 30% in DC superposition, unit: A) of the inductance element equipped with the coil-embedded dust core. However, since the core volume V of the dust core cannot be increased despite the increased first volume V1, increasing the first volume V1 decreases the second volume V2 of the second region. Since a smaller V2 affects both L and Isat, L and Isat respectively have different nonlinear relationships when evaluated in terms of inner core volume ratio RV. The inner core volume ratio RV is a value obtained by normalizing the ratio V1/V2 by using a ratio (1−V/Vp) of the coil volume with respect to the chip volume Vp, and the total of the coil volume and the core volume V is the chip volume Vp. Due to the different nonlinear relationships described above, the Isat×L/DCR, which is considered to be the index of comprehensive evaluation of the characteristics of the inductance element, shows a tendency to peak at an inner core volume ratio RV in the range of 3 to 5. This tendency is found even when the composition of the magnetic powder contained in the dust core and/or the method for producing the dust core varies. Thus, in designing the shape of the coil-embedded dust core, the inner core volume ratio RV is set to be within the range of 3 to 5 so that the inductance element can easily obtain good characteristics irrespective of the composition of the magnetic powder or the method for producing the dust core.

A least a portion of the magnetic powder contained in the dust core may include an amorphous magnetic material, and, more specifically, may include an amorphous magnetic material and a crystalline magnetic material, for example. The magnetic powder contained in the dust core may be solely composed of an amorphous magnetic material or a crystalline magnetic material.

Specific examples of the crystalline magnetic material include Fe—Si—Cr alloys, Fe—Ni alloys, Fe—Co alloys, Fe—V alloys, Fe—Al alloys, Fe—Si alloys, Fe—Si—Al alloys, carbonyl iron, and pure iron, and the crystalline magnetic material may contain one material or two or more materials selected from the group consisting of these alloys. In some cases, the crystalline magnetic material preferably includes an Fe—Si—Cr alloy.

Specific examples of the amorphous magnetic material include Fe—Si—B alloys, Fe—P—C alloys, and Co—Fe—Si—B alloys, and the amorphous magnetic material may contain one material or two or more materials selected from the group consisting of these alloys. In some cases, the amorphous magnetic material preferably includes an Fe—P—C alloy.

Another aspect of the present invention provides an inductance element that includes the aforementioned coil-embedded dust core; and connecting terminals respectively coupled to end portions of the coil of the coil-embedded dust core. Such an inductance element can improve the DC superposition characteristics while maintaining the basic characteristics (L/DCR) due to the excellent characteristics of the aforementioned coil-embedded dust core.

Yet another aspect of the present invention provides an electric or electronic device that includes the aforementioned inductance element mounted thereto, in which the inductance element is connected to a substrate via the connecting terminals. Examples of such an electric or electronic device include a power supply equipped with a power supply switching circuit, a voltage boosting/dropping circuit, a smoothing circuit, etc., and a small portable communication appliance. Since the electric or electronic device of the present invention is equipped with the aforementioned inductance element, the device is suitable for downsizing.

The coil-embedded dust core of the invention described above has a dust core having an appropriate balance between the volume on the inner side of the coil and the volume on the outer side of the coil; thus, the inductance element equipped with such a coil-embedded dust core can have improved DC superposition characteristics while maintaining the basic characteristics (L/DCR). Moreover, the present invention also provides an inductance element equipped with the aforementioned coil-embedded dust core, and an electric or electronic device having the aforementioned inductance element mounted thereto.

DESCRIPTION OF THE PREFERRED EMBODIMENTS

Figure 1:
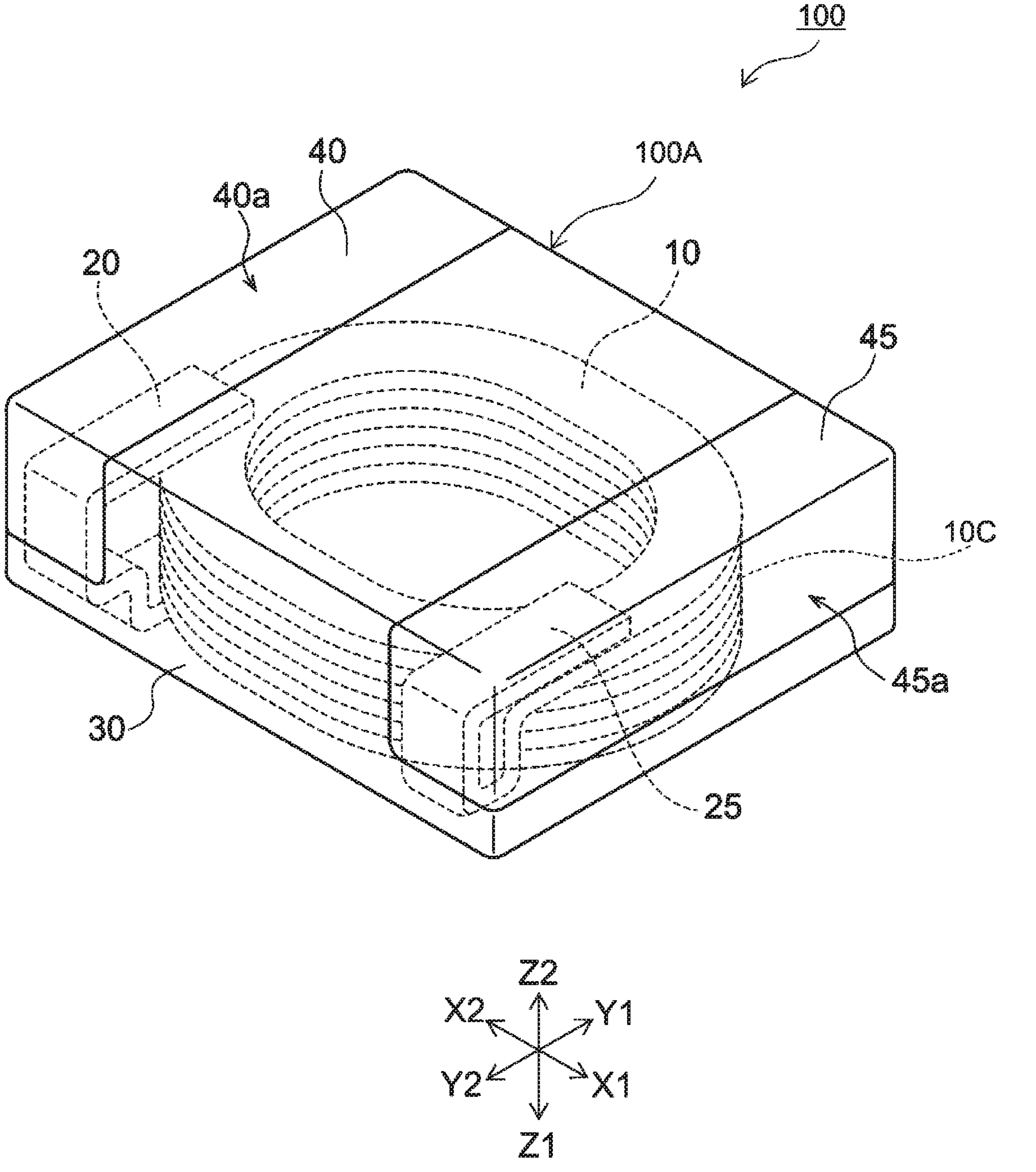
FIG. 1 is a schematic perspective view illustrating the shape of an inductance element equipped with a coil-embedded dust core according to one embodiment of the present invention.
Figure 2A:
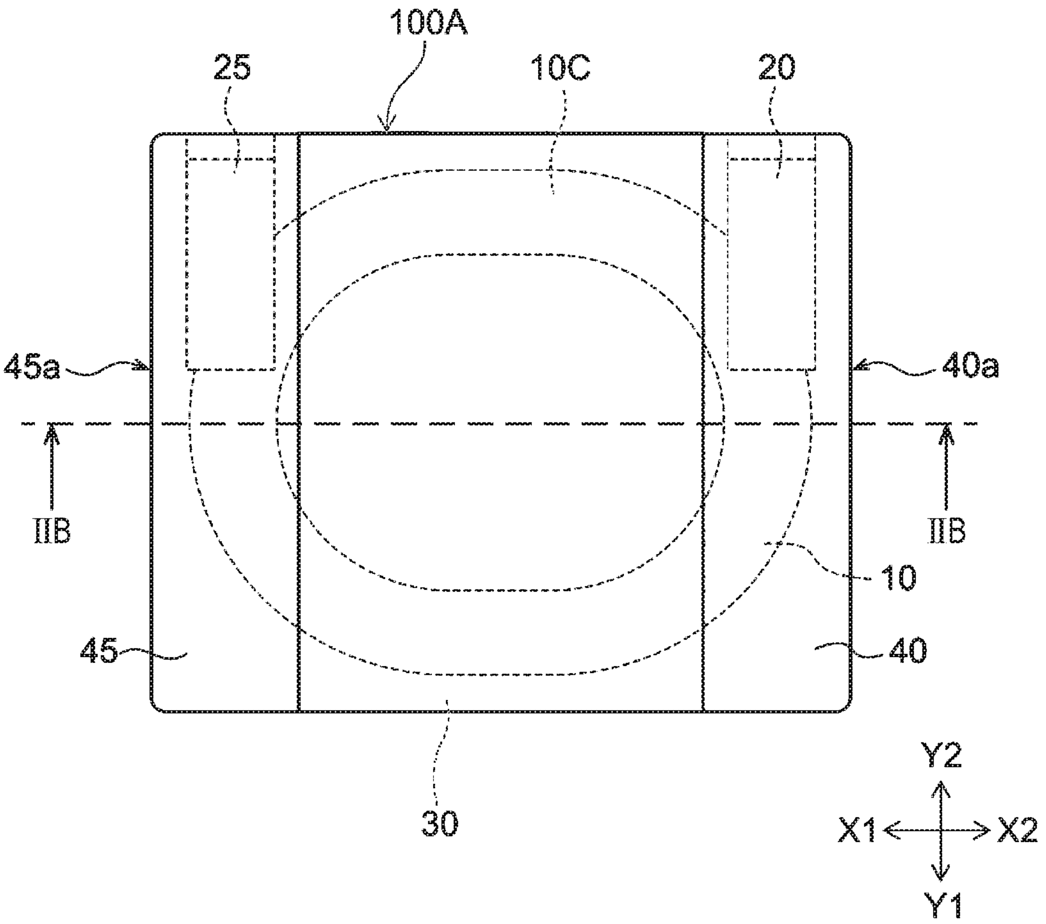
FIG. 2A is a top view of the coil-embedded dust core according to one embodiment of the present invention.
Figure 2B:
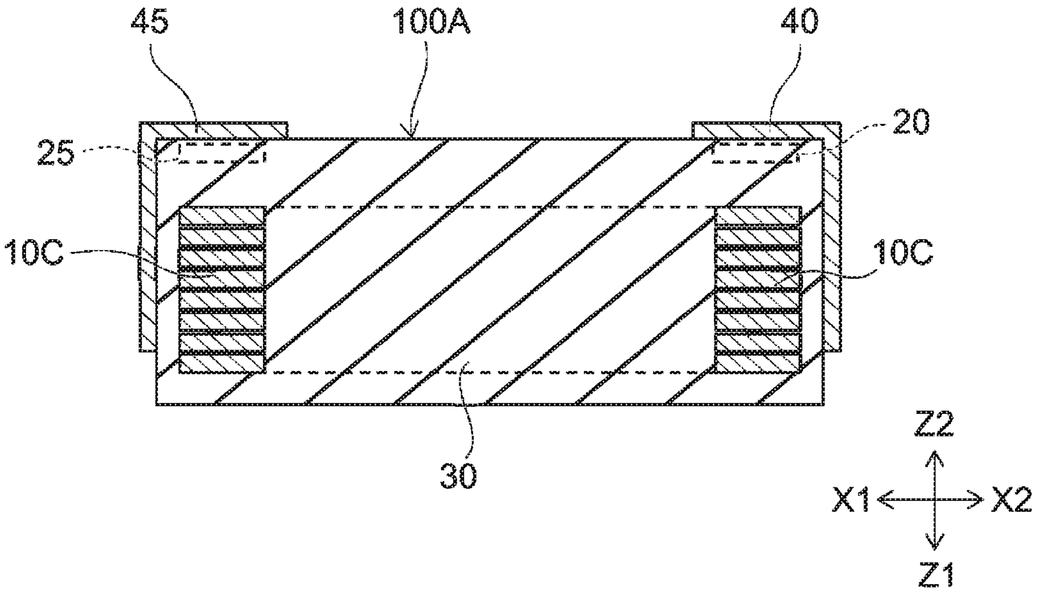
FIG. 2B is a cross-sectional view taken along line IIB-IIB in FIG. 2A.

The embodiments of the present invention will now be described in detail. FIG. 1 is a schematic perspective view illustrating the shape of an inductance element equipped with a coil-embedded dust core according to one embodiment of the present invention. FIG. 2A is a top view of the coil-embedded dust core according to one embodiment of the present invention. FIG. 2B is a cross-sectional view taken along line IIB-IIB in FIG. 2A. An inductance element 100 according to one embodiment of the present invention is equipped with a coil-embedded dust core 100A in which a coil 10 including a winding body 10C and terminals 20 and 25 disposed at two ends of the winding body 10C is embedded in a cubic or rectangular parallelepiped dust core 30 that has a magnetic powder-containing dust compact.

The coil 10 is an edgewise coil, is made of a conductive metal material covered with an insulating material, and is formed by winding a conductive strip having a rectangular cross-sectional shape. In the winding body 10C, the conductive strip is wound such that the plate surfaces of the turns are placed on top of each other along the winding axis so that the plate surface of the conductive strip is substantially perpendicular to the winding axis (direction along the Z1-Z2 direction) (in other words, the plate surface lies along the X-Y plane) and that the side edge surfaces of the conductive strip that define the thickness direction of the winding body 10C are parallel to the winding axis. Thus, the upper and lower end surfaces (two end surfaces in the Z1-Z2 direction) of the winding body 10C have a normal in a direction along the winding axis of the winding body 10C. The cross-sectional shape of the coil 10 may be any. The cross-sectional shape of the coil 10 may be circular (round wire). When the cross-sectional shape of the coil 10 is rectangular such as an oblong shape as described above, the occupancy rate of the winding body 10C can be increased, and thus such a shape is preferable. Alternatively, the coil 10 may be an α-coil instead of the edgewise coil described above.

The specific composition of the conductive metal material is not limited. Good conductors such as copper, copper alloys, aluminum, and aluminum alloys are preferable. The type of the insulating material covering the conductive metal material is not limited. A specific example of a preferable material is a resin material such as enamel. When the coil 10 is an edgewise coil, the insulating material located on the outer surface side is easily stretched, and thus a material that undergoes less insulating property degradation when stretched is preferably used.

In a state in which the winding body 10C of the coil 10 is wound into a ring, two end portions of the conductive strip constituting the coil 10 protrude and are bent back so that the portions close to the ends of the conductive strip constitute the terminals 20 and 25. As illustrated in FIG. 1, the terminal 20 at one end portion of the conductive strip constituting the coil 10 is bent multiple times, one portion protrudes from the inside of the dust core 30, and a portion extending from this portion to the end of the conductive strip is located outside the dust core 30. In other words, the tip portion of the terminal 20 is located outside the dust core 30. The terminal 25 at another end portion of the conductive strip constituting the coil 10 is also bent multiple times, one portion protrudes from the inside of the dust core 30, and a portion extending from this portion to the end of the conductive strip is located outside the dust core 30. In other words, the tip portion of the terminal 25 is located outside the dust core 30.

In the inductance element 100 illustrated in FIGS. 1, 2A, and 2B, the winding body 10C and the terminals 20 and 25 are composed of the same member (conductive strip); however, this is not limiting. Separate members may be joined to end portions of the conductive strip constituting the winding body 10C so that these members serve as the terminals 20 and 25 of the coil 10.

The inductance element 100 according to one embodiment of the present invention is equipped with a pair of application-type electrodes 40 and 45 serving as connecting terminals. The pair of the application-type electrodes 40 and 45 on the upper surface of the dust core 30 are respectively electrically coupled to the terminals 20 and 25, and respectively have side surface application portions 40*a* and 45*a* disposed on portions of the side surfaces of the dust core 30. As illustrated in FIG. 1, the application-type electrodes 40 and 45 are also formed on the side surfaces of the dust core 30 where the portions of the conductive strip constituting the coil 10 protruding from the dust core 30 are located as well as on portions of the side surfaces that oppose these side surfaces. In addition, although not illustrated in the drawings, plating films of a metal element such as nickel or tin may be disposed on the application-type electrodes 40 and 45 so as to improve the adhesion to a solder used in mounting the element onto a circuit board. Alternatively, instead of the application-type electrodes 40 and 45, electrode films may be formed on the dust core 30 by sputtering or plating so as to form connecting terminals.

As illustrated in FIGS. 2A and 2B, in the coil-embedded dust core 100A, the winding body 10C of the coil 10 is embedded in the dust core 30. Since the winding body 10C is edgewise wound, the conductive strip constituting the winding body 10C is wound about the winding axis along the Z1-Z2 direction. In the example illustrated in FIGS. 1, 2A, and 2B, the way in which the conductive strip is wound in the winding body 10C is edgewise winding; however, other winding method, such as a winding, may be employed.

The dust core 30 contains a magnetic powder, and, in this embodiment, at least a portion of the magnetic powder is formed of an amorphous magnetic material. In this embodiment, as a specific example, the magnetic powder contains a crystalline magnetic material powder and an amorphous magnetic material powder. In addition, the dust core 30 contains a binding component that binds the crystalline magnetic material powder and the amorphous magnetic material powder with other materials (the same materials in some cases or different materials in other cases) contained in the dust core 30. In this embodiment, the binding component contains at least one selected from resins and thermally denatured resins. The binding component may contain an inorganic material such as liquid glass. Note that the magnetic powder contained in the dust core may be solely composed of an amorphous magnetic material or a crystalline magnetic material.

The crystalline magnetic material that gives the crystalline magnetic material powder contained in the dust core 30 is not limited to a specific type as long as the material is crystalline (a diffraction spectrum having a peak clear enough to be able to identify the type of material is obtained by common X-ray diffraction spectrometry), ferromagnetic, and, in particular, soft magnetic. Specific examples of the crystalline magnetic material include Fe—Si—Cr alloys, Fe—Ni alloys, Fe—Co alloys, Fe—V alloys, Fe—Al alloys, Fe—Si alloys, Fe—Si—Al alloys, carbonyl iron, and pure iron. The aforementioned crystalline magnetic material may be composed of one material or multiple materials. The crystalline magnetic material that gives the crystalline magnetic material powder is preferably one material or two or more materials selected from the group consisting of the aforementioned materials, and, among these, the crystalline magnetic material preferably contains an Fe—Si—Cr alloy and more preferably is composed of an Fe—Si—Cr alloy. Among crystalline magnetic materials, an Fe—Si—Cr alloy is a material relatively capable of decreasing the iron loss Pcv; thus, increasing the mass ratio of the content of the crystalline magnetic material powder relative to the total of the content of the crystalline magnetic material powder and the content of the amorphous magnetic material powder (in this description, this ratio may also be referred to as a "first mixing ratio") in the dust core 30 does not readily increase the iron loss Pcv of the inductance element 100 equipped with the dust core 30. The Si content and the Cr content in the Fe—Si—Cr alloy is not particularly limited. A non-limiting example is that the Si content is about 2 to 7 mass %, and the Cr content is about 2 to 7 mass %.

The shape of the crystalline magnetic material powder contained in the dust core 30 is not particularly limited. The powder may be spherical or non-spherical. Since the crystalline magnetic material is relatively softer than the amorphous magnetic material, the crystalline magnetic material may take irregular shapes between the particles of the amorphous magnetic material powder in the dust core 30. The crystalline magnetic material powder content in the dust core 30 is in some cases preferably such an amount that the first mixing ratio is 30 mass % or more and 70 mass % or less. As described below, from the viewpoint of obtaining high levels of the basic characteristics and the DC superposition characteristics of the inductance element 100, the first mixing ratio is in some cases preferably 30 mass % or more and 55 mass % or less.

At least a portion of the crystalline magnetic material powder is preferably composed of a material subjected to a surface insulation treatment, more preferably, the crystalline magnetic material powder is composed of a material subjected to a surface insulation treatment. When the crystalline magnetic material powder is subjected to a surface insulation treatment, the insulation resistance of the dust core 30 tends to improve. The type of the surface insulation treatment performed on the crystalline magnetic material powder is not particularly limited. Examples thereof include a phosphoric acid treatment, a phosphate treatment, and an oxidizing treatment.

The amorphous magnetic material that gives the amorphous magnetic material powder contained in the dust core 30 is not limited to a specific type as long as the material is amorphous (a diffraction spectrum having a peak clear enough to be able to identify the type of material is not obtained by common X-ray diffraction spectrometry), ferromagnetic, and, in particular, soft magnetic. Specific examples of the amorphous magnetic material include Fe—Si—B alloys, Fe—P—C alloys, and Co—Fe—Si—B alloys. The aforementioned amorphous magnetic material may be composed of one material or multiple materials. The magnetic material that constitutes the amorphous magnetic material powder is preferably one material or two or more materials selected from the group consisting of the aforementioned materials, and, among these, the magnetic material preferably contains an Fe—P—C alloy and more preferably is composed of an Fe—P—C alloy. An inductance element 100 that has a dust core 30 that contains an amorphous magnetic material powder composed of an Fe—P—C alloy as the magnetic powder has a low iron loss Pcv, but, as a general tendency, the DC superposition characteristics tend to be low. Thus, when the coil-embedded dust core 100A according to one embodiment of the present invention contains a magnetic powder of an Fe—P—C alloy, good DC superposition characteristics can be obtained while benefiting from a low iron loss Pcv attributable to the Fe—P—C alloy.

Specific examples of the Fe—P—C alloy include Fe-based amorphous alloys represented by a compositional formula $Fe_{100\ at\ \%-a-b-c-x-y-z-t}Ni_aSn_bCr_cP_xC_yB_zSi_t$, where 0 at %≤a≤10 at %, 0 at %≤b≤3 at %, 0 at %≤c≤6 at %, 6.8 at %≤x≤13 at %, 2.2 at %≤y≤13 at %, 0 at %≤z≤9 at %, and 0 at %≤t≤7 at %. In the compositional formula described above, Ni, Sn, Cr, B, and Si are optional additive elements.

The added amount a of Ni is preferably 0 at % or more and 6 at % or less and more preferably 0 at % or more and 4 at % or less. The added amount b of Sn is preferably 0 at % or more and 2 at % or less and may be in the range of 1 at % to 2 at %. The added amount c of Cr is preferably 0 at % or more and 2 at % or less and more preferably 1 at % or more and 2 at % or less. The added amount x of P is in some cases preferably 8.8 at % or more. The added amount y of C is in some cases preferably 5.8 at % or more and 8.8 at % or less. The added amount z of B is preferably 0 at % or more and 3 at % or less and more preferably 0 at % or more and 2 at % or less. The added amount t of Si is preferably 0 at % or more and 6 at % or less and more preferably 0 at % or more and 2 at % or less.

The shape of the amorphous magnetic material powder contained in the dust core 30 is not particularly limited. The shape may be spherical, elliptical, flaky, or irregular. In relation to the production method, it may be easy to form a spherical or oval amorphous magnetic material. In general, since the amorphous magnetic material is harder than the crystalline magnetic material, it is preferable in some cases that the crystalline magnetic material be non-spherical so as to induce deformation during pressure-compacting.

The shape of the amorphous magnetic material powder contained in the dust core 30 may be a shape obtained at the stage of producing the powder, or may be a shape obtained by performing a secondary process on the produced powder. Examples of the former shape include spherical, oval, and needle shapes, and examples of the latter shape include a flaky shape.

The particle diameter of the amorphous magnetic material powder contained in the dust core 30 is preferably 15 μm or less in terms of the particle diameter (in this description, also referred to as the "median diameter") $D_{50}A$ at which the cumulative particle size distribution counted from the small diameter side in a volume-based particle size distribution is 50%. When the median diameter $D_{50}A$ of the amorphous magnetic material powder is 15 μm or less, it becomes easier to reduce the iron loss Pcv while improving the DC superposition characteristics of the inductance element 100 equipped with the dust core 30. From the viewpoint of stably achieving reduction of the iron loss Pcv while improving the DC superposition characteristics of the inductance element 100 equipped with the dust core 30, the median diameter $D_{50}A$ of the amorphous magnetic material powder is in some cases preferably 10 μm or less, in some cases preferably 7 μm or less, and in some cases particularly preferably 5 μm or less.

The dust core 30 contains a binding component that binds the crystalline magnetic material powder and the amorphous magnetic material powder with other materials contained in the dust core 30. The binding component may have any composition as long as the material contributes to fixing the magnetic powder contained in the dust core 30 according to this embodiment. Examples of the material constituting the binding component include organic materials such as resin materials and pyrolysis residues of the resin materials (in this description, these materials are generally referred to as the "resin material-based components"), and inorganic materials. Examples of the resin materials include acrylic resins, silicone resins, epoxy resins, phenolic resins, urea resins, and melamine resins. Examples of the binding component composed of an inorganic material include glass materials such as liquid glass. The binding component may be composed of one material or multiple materials. The binding component may be a mixture of an organic material and an inorganic material.

Usually, an insulating material is used as the binding component. In this manner, the insulating property of the dust core 30 can be increased.

The method for producing the dust core 30 includes a compacting step of forming a powder containing a magnetic powder into a compacted product, and, if needed, a heat treatment step of heating the compacted product.

First, a mixture containing a magnetic powder, and a component that gives a binding component for the dust core 30 is prepared. The component (in this description, the component may be referred to as a "binder component") that gives the binding component may be the binding component itself in some cases or may be a material different from the binding component in other cases. A specific example of the latter is the case in which the binder component is a resin material and the binding component is a pyrolysis residue of the resin material.

A compacted product can be obtained by a compacting process that includes pressure-compacting the mixture. The pressurizing conditions are not particularly limited and are appropriately determined on the basis of the composition of the binder component and the like. For example, when the binder component is composed of a thermosetting resin, it is preferable to allow a curing reaction of the resin to progress in a mold while applying pressure and heat. Meanwhile, in the case of compression compacting, the pressurizing force is high, but heating is not a required condition, and pressurizing is performed for a short time. Examples of the pressurizing conditions for the compression compacting are 0.3 GPa or more and 2 GPa or less, and the pressurizing conditions are preferably 0.5 GPa or more and 2 GPa or less in some examples, and more preferably 0.8 GPa or more and 2 GPa or less in other examples. For compression compacting, pressurizing may be conducted while heating or at room temperature.

The compacted product obtained in the compacting step may be the dust core 30 according to this embodiment, or, as described below, a dust core 30 may be obtained by performing a heat treatment step on the compacted product. In the heat treatment step, the compacted product obtained in the aforementioned compacting step is heated so as to adjust the magnetic properties through correcting the inter-particle distance of the magnetic powder and adjust the magnetic properties by relaxing the strain applied to the magnetic powder during the compacting step, as a result of which a dust core 30 is obtained.

As mentioned above, the heat treatment step is performed to adjust the magnetic properties of the dust core 30; thus, the heat treatment conditions such as the heat treatment temperature is set to optimize the magnetic properties of the dust core 30. One example of the method for setting the heat treatment conditions is to change the heating temperature of the compacted product but maintain other conditions, such as the temperature elevation rate and the retention time at the heating temperature, constant. The evaluation standard for the magnetic properties of the dust core 30 when setting the heat treatment conditions is not particularly limited. A specific example of the evaluation item is the iron loss Pcv of the dust core 30. In this case, the heating temperature of the compacted product may be set so that the iron loss Pcv of the dust core 30 is minimum. The measurement conditions for the iron loss Pcv are set as appropriate; for example, conditions in which frequency is set at 100 kHz and the effective maximum magnetic flux density Bm is set at 100 mT may be employed.

The atmosphere during the heat treatment is not particularly limited. In an oxidizing atmosphere, there are a higher possibility that the pyrolysis of the binder component may proceed excessively and a higher possibility that the oxidation of the magnetic powder may proceed; thus, the heat treatment is preferably performed in an inert atmosphere such as nitrogen and argon or in a reducing atmosphere such as hydrogen. A non-limiting example of the heat treatment temperature is the range of 200° C. to 400° C.

In the following description, the simulation results of various characteristics (basic characteristics and the DC superposition characteristics) analyzed by dividing the coil-embedded dust core 100A into multiple regions and varying the volumes of these regions are described. As described next, it has become clear from the simulation results that when the volumes of the multiple regions constituting the coil-embedded dust core 100A of this embodiment satisfy a particular relationship, the comprehensive evaluation (Isat× L/DCR) of the basic characteristics (self-inductance L and the DC resistance component DCR) and the DC superposition characteristics (Isat) of the inductance element 100 equipped with a coil-embedded dust core 100A improves.

Figure 3A:
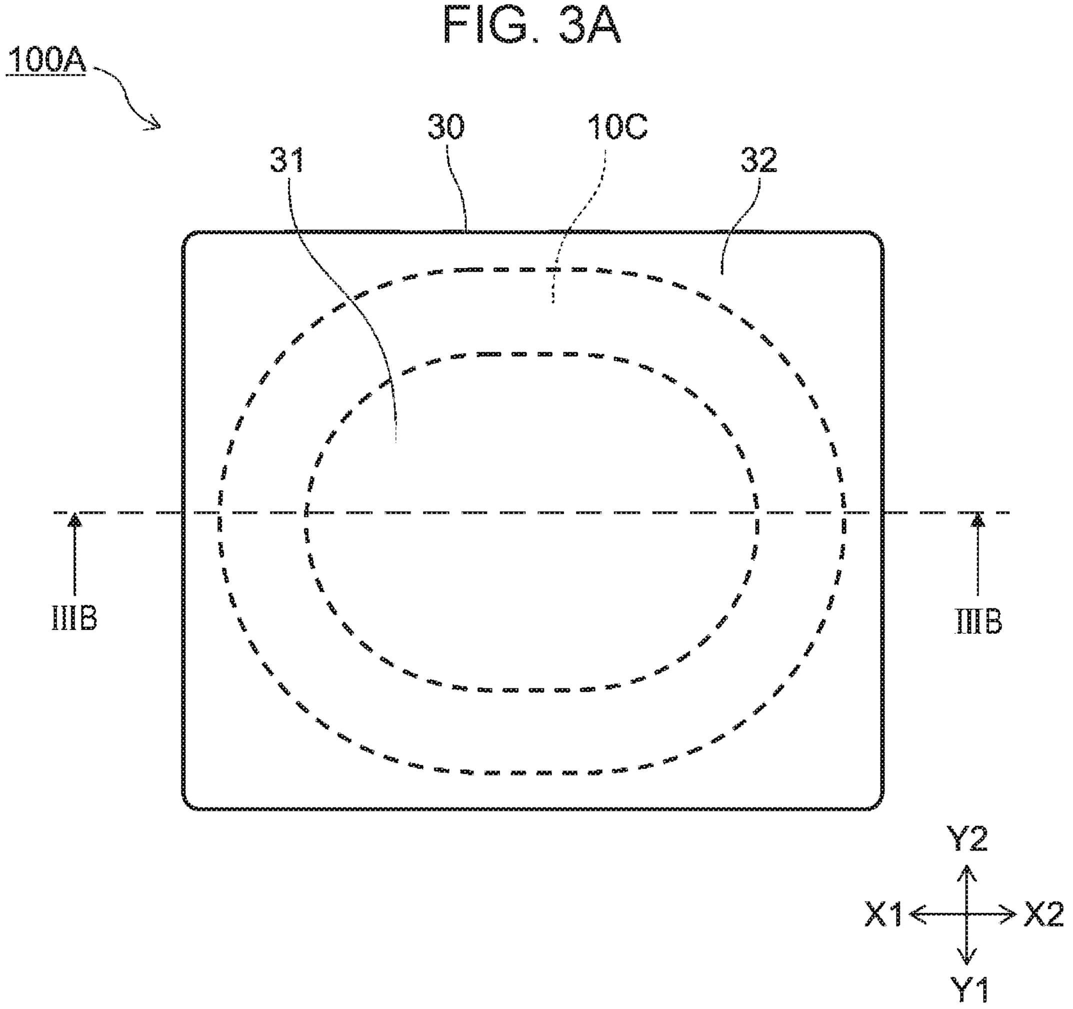
FIG. 3A is a top view of a coil-embedded dust core subjected to simulation.
Figure 3B:
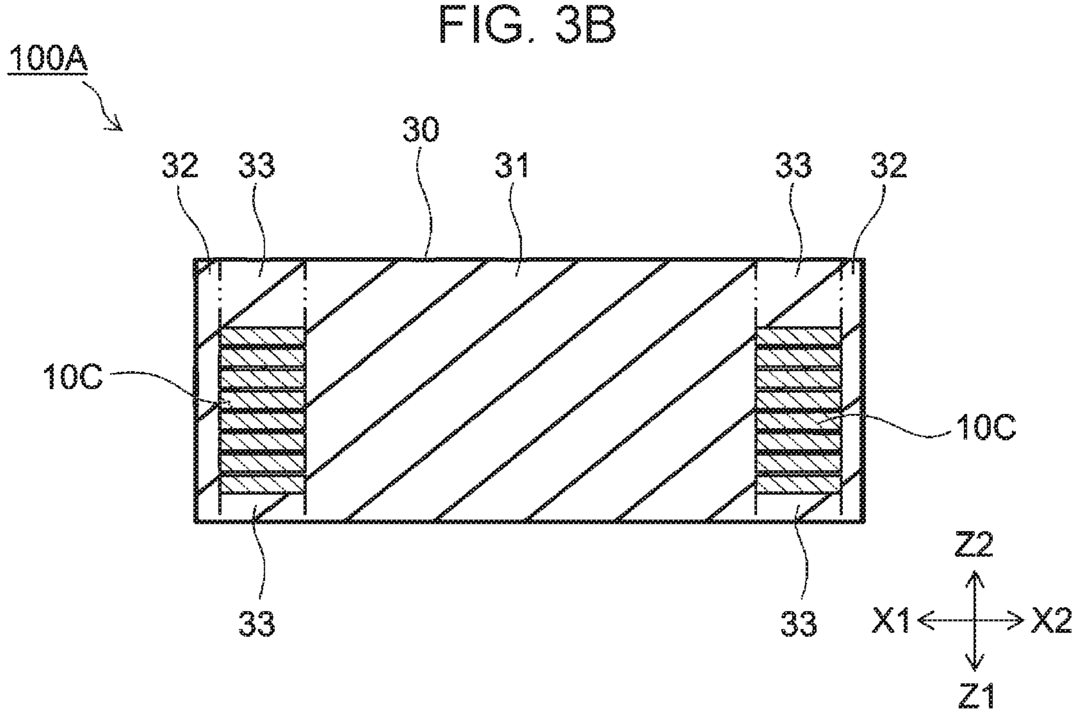
FIG. 3B is a cross-sectional view taken along line IIIB-IIIB in FIG. 3A.

From the viewpoint of facilitating the simulation, the volumes of the terminals 20 and 25 disposed at two end portions of the coil 10 are ignored in dividing the coil-embedded dust core 100A into multiple regions. FIG. 3A is a top view of a coil-embedded dust core subjected to the simulation, and FIG. 3B is a cross-sectional view taken along line IIIB-IIIB in FIG. 3A. This simulation is performed by using an edgewise coil formed of a rectangular wire.

When simplified as illustrated in FIGS. 3A and 3B, the coil-embedded dust core 100A is constituted by a region (core region) formed of the dust core 30 and a region (coil region) formed of the winding body 10C. Thus, the chip volume Vp, which is the volume of the coil-embedded dust core 100A, is expressed as follows:

$$Vp=V+Vc$$

Here, V represents the volume of the core region, and Vc represents the volume of the coil region. In this embodiment, the core region is constituted by a first region 31 to a third region 33 described below. First, the first region 31 is a region located on the inner side of the winding body 10C when the coil-embedded dust core 100A is viewed in a first direction (Z1-Z2 direction) along the winding axis of the winding body 10C. The second region 32 is a region located on the outer side of the winding body 10C when the coil-embedded dust core 100A is viewed in the first direction (Z1-Z2 direction). The third region 33 is a region overlapping the winding body 10C when the coil-embedded dust core 100A is viewed in the first direction (Z1-Z2 direction). When the volume (first volume) of the first region 31 is represented by V1, the volume (second volume) of the second region 32 is represented by V2, and the volume (third volume) of the third region 33 is represented by V3, the volume V of the core region is expressed as follows:

$$V=V1+V2+V3$$

The magnetic flux generated by the current flowing in the coil 10 passes the first region 31; thus, the larger the first volume V1, the less likely the magnetic flux saturation. Accordingly, increasing the first volume V1 increases the self-inductance L and improves the DC superposition characteristics (specifically, the increase in Isat). However, increasing the first volume V1 also increases the length of the winding body 10C located around the first region 31, and thus also increases the DC resistance component DCR of the coil 10. Furthermore, unless the core volume V is increased, increasing the first volume V1 decreases the volume (second volume V2) of the second region 32. When the second volume V2 is decreased, the characteristics of the inductance element 100 are naturally affected.

In order to examine the influence of the respective regions in the coil-embedded dust core 100A, simulation was performed by using the structure illustrated in FIGS. 3A and 3B. For this simulation, the inner core volume ratio RV defined as below was used as a parameter for defining the shape.

$$RV=(V1/V2)/(1-V/Vp)$$

The inner core volume ratio RV is obtained by normalizing the ratio V1/V2 of the first volume V1 to the second volume V2 by using a ratio Vc/Vp of the volume Vc of the winding body 10C to the chip volume Vp. Since Vc=Vp−V, in the aforementioned definition, not the volume Vc of the winding body 10C but the volume V of the dust core 30 is used.

By using the inner core volume ratio RV, the influence of the ratio V1/V2 of the first volume V1 to the second volume V2 can be evaluated without being affected by the relationship between the volume Vc (=Vp−V) of the winding body 10C and the chip volume Vp.

In the simulation, parameters obtained by measuring three types of dust cores (core Nos. 1 to 3) having different magnetic properties were used so as to confirm the influence in the difference of the materials constituting the dust cores 30 equipped with the coil-embedded dust cores 100A on various characteristics (calculation examples 1 to 3). Specifically, the dust cores used in measuring the magnetic properties had a toroidal core shape with an outer diameter of 20 mm, an inner diameter of 12 mm, and a thickness of 3 mm. The magnetic powder contained in the dust core was a mixed powder of an Fe—P—C alloy amorphous magnetic material powder and an Fe—Si—Cr alloy crystalline magnetic material powder, and the mass ratio (first mixing ratio) of the content of the crystalline magnetic material powder to the total of the content of the crystalline magnetic material powder and the content of the amorphous magnetic material powder in the dust core was selected from the range of 30 mass % or more and 55 mass % or less. For the production of the dust core, the compression compacting condition was selected from the range of 0.5 GPa to 1.5 GPa, and the heat treatment condition was selected from the range of 300° C. to 450° C. as appropriate.

More specifically, when compared with the dust core (core No. 1) of calculation example 1 serving as the reference, the dust core (core No. 2) of calculation example 2 had a relatively high content ratio of the crystalline magnetic powder in the magnetic powder, and involved a relatively low compacting pressure. When compared with the dust core (core No. 2) of calculation example 2 serving as the reference, the dust core (core No. 3) of calculation example 3 involved a relatively low heat treatment temperature. The magnetic properties of these three dust cores (core Nos. 1 to 3) were measured and the results are shown in Table 1. The frequency of the magnetic field applied during the measurement of the initial magnetic permeability μ and a magnetic permeability μ5500 in a 5500 A/m magnetic field was 100 kHz. The Isat (unit: A) was measured from a thirty-four-turn coil on a toroidal core.

TABLE 1

| Core No. | μ | μ5500 | Isat(A) |
|---|---|---|---|
| 1 | 33.39 | 27.64 | 12.20 |
| 2 | 27.47 | 24.47 | 15.90 |
| 3 | 25.24 | 22.90 | 18.00 |

Figure 4A:
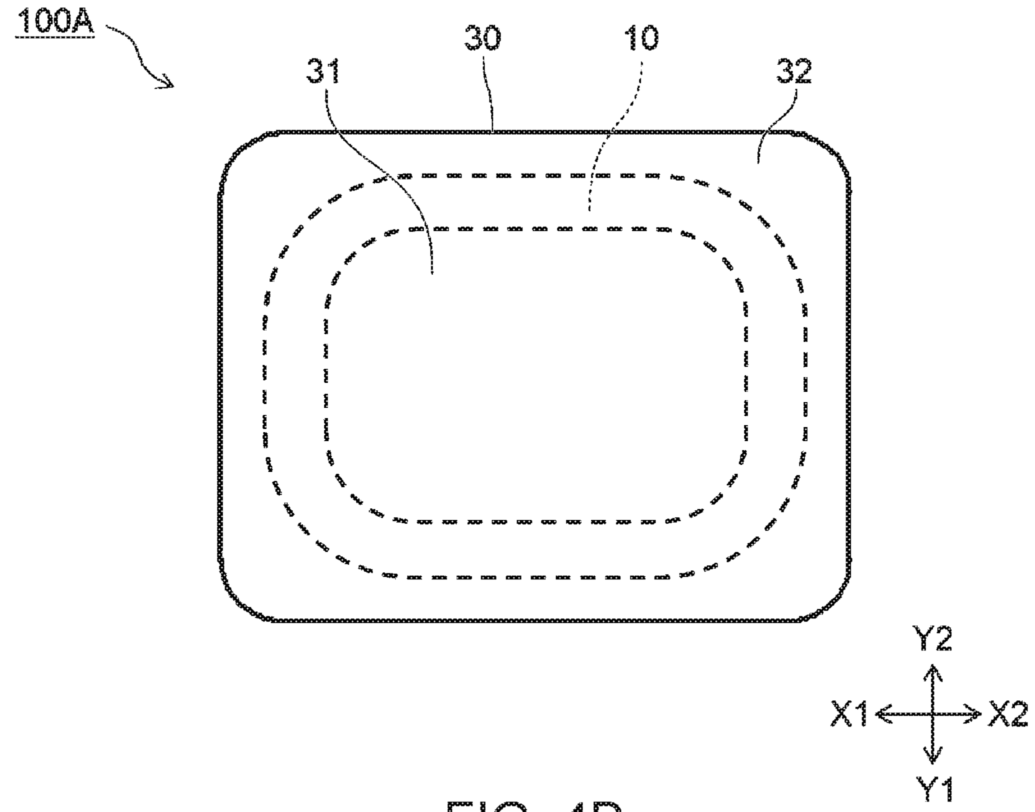
FIG. 4A is a top view of a coil-embedded dust core of calculation example 1-1.
Figure 4B:
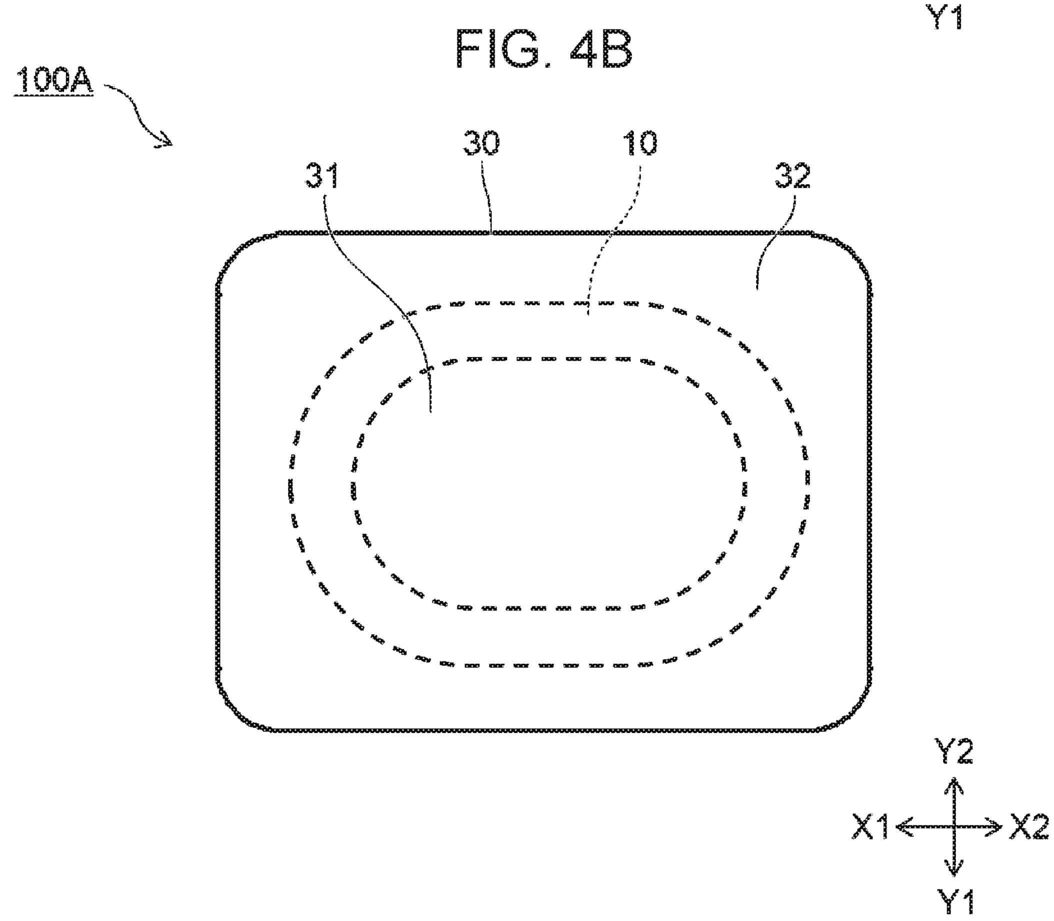
FIG. 4B is a top view of a coil-embedded dust core of calculation example 1-6.

The results are shown in Tables 2 to 4. Table 2 shows the results of calculation example 1, Table 3 shows the results of calculation example 2, and Table 4 shows the results of calculation example 3. The RV decreases from calculation example 1-1 to calculation example 1-6. Thus, as shown in FIGS. 4A and 4B, the winding body 10C in the coil-embedded dust core 100A (FIG. 4A) of calculation example 1-1 is located on the outer circumferential side of the winding body 10C in the coil-embedded dust core 100A (FIG. 4B).

TABLE 2

| | V1/V2 | RV | V/VP | 1 − V/VP | DCR (mΩ) | L (uH) | Isat (A) | Isat × L/ DCR (%) | Remark |
|---|---|---|---|---|---|---|---|---|---|
| Calculation Example 1-1 | 1.290 | 5.056 | 0.745 | 0.255 | 93.22 | 2.496 | 2.146 | 106.2% | Example |
| Calculation Example 1-2 | 1.152 | 4.679 | 0.754 | 0.246 | 90.47 | 2.510 | 2.081 | 106.7% | Example |
| Calculation Example 1-3 | 1.000 | 4.217 | 0.763 | 0.237 | 87.55 | 2.500 | 2.049 | 108.2% | Example |
| Calculation Example 1-4 | 0.841 | 3.689 | 0.772 | 0.228 | 84.70 | 2.470 | 1.987 | 107.1% | Example |
| Calculation Example 1-5 | 0.688 | 3.132 | 0.780 | 0.220 | 81.82 | 2.420 | 1.930 | 105.5% | Example |
| Calculation Example 1-6 | 0.503 | 2.440 | 0.794 | 0.206 | 77.10 | 2.280 | 1.829 | 100.0% | Comparative Example |

TABLE 3

| | V1/V2 | RV | V/VP | 1 − V/VP | DCR (mΩ) | L (uH) | Isat (A) | Isat × L/ DCR (%) | Remark |
|---|---|---|---|---|---|---|---|---|---|
| Calculation Example 2-1 | 1.290 | 5.056 | 0.745 | 0.255 | 93.22 | 1.923 | 2.871 | 109.5% | Example |
| Calculation Example 2-2 | 1.152 | 4.679 | 0.754 | 0.246 | 90.47 | 1.930 | 2.758 | 108.8% | Example |
| Calculation Example 2-3 | 1.000 | 4.217 | 0.763 | 0.237 | 87.55 | 1.918 | 2.736 | 110.8% | Example |
| Calculation Example 2-4 | 0.841 | 3.689 | 0.772 | 0.228 | 84.70 | 1.890 | 2.664 | 109.9% | Example |
| Calculation Example 2-5 | 0.688 | 3.132 | 0.780 | 0.220 | 81.82 | 1.850 | 2.534 | 106.0% | Example |
| Calculation Example 2-6 | 0.503 | 2.440 | 0.794 | 0.206 | 77.10 | 1.740 | 2.383 | 99.5% | Comparative Example |

TABLE 4

| | V1/V2 | RV | V/VP | 1 − V/VP | DCR (mΩ) | L (uH) | Isat (A) | Isat × L/ DCR (%) | Remark |
|---|---|---|---|---|---|---|---|---|---|
| Calculation Example 3-1 | 1.290 | 5.056 | 0.745 | 0.255 | 93.22 | 1.793 | 3.118 | 110.9% | Example |

TABLE 4-continued

| | V1/V2 | RV | V/VP | 1 − V/VP | DCR (mΩ) | L (uH) | Isat (A) | Isat × L/DCR (%) | Remark |
|---|---|---|---|---|---|---|---|---|---|
| Calculation Example 3-2 | 1.152 | 4.679 | 0.754 | 0.246 | 90.47 | 1.800 | 2.981 | 109.7% | Example |
| Calculation Example 3-3 | 1.000 | 4.217 | 0.763 | 0.237 | 87.55 | 1.787 | 2.932 | 110.7% | Example |
| Calculation Example 3-4 | 0.841 | 3.689 | 0.772 | 0.228 | 84.70 | 1.761 | 2.857 | 109.8% | Example |
| Calculation Example 3-5 | 0.688 | 3.132 | 0.780 | 0.220 | 81.82 | 1.720 | 2.736 | 106.3% | Example |
| Calculation Example 3-6 | 0.503 | 2.440 | 0.794 | 0.206 | 77.10 | 1.620 | 2.592 | 100.7% | Comparative Example |

The following results were obtained from the simulation.

Figure 5:
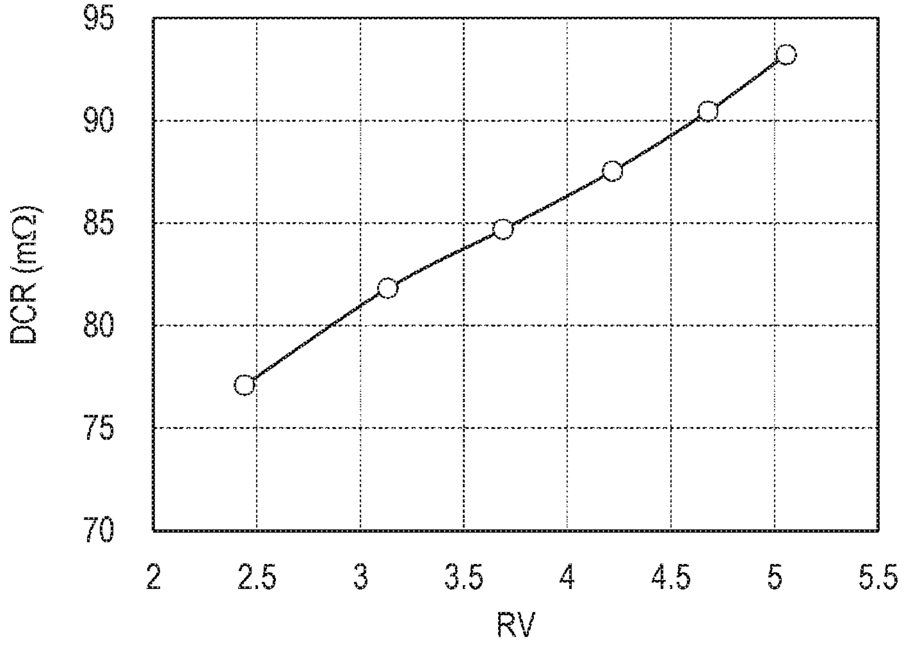
FIG. 5 is a graph showing the relationship between DCR and RV.

(Result 1) As illustrated in FIG. 5, the DC resistance component DCR increases linearly with respect to the inner core volume ratio RV. Since the DC resistance component DCR does not change depending on the material constituting the dust core 30, only a plot of one system is shown in FIG. 5.

Figure 6:
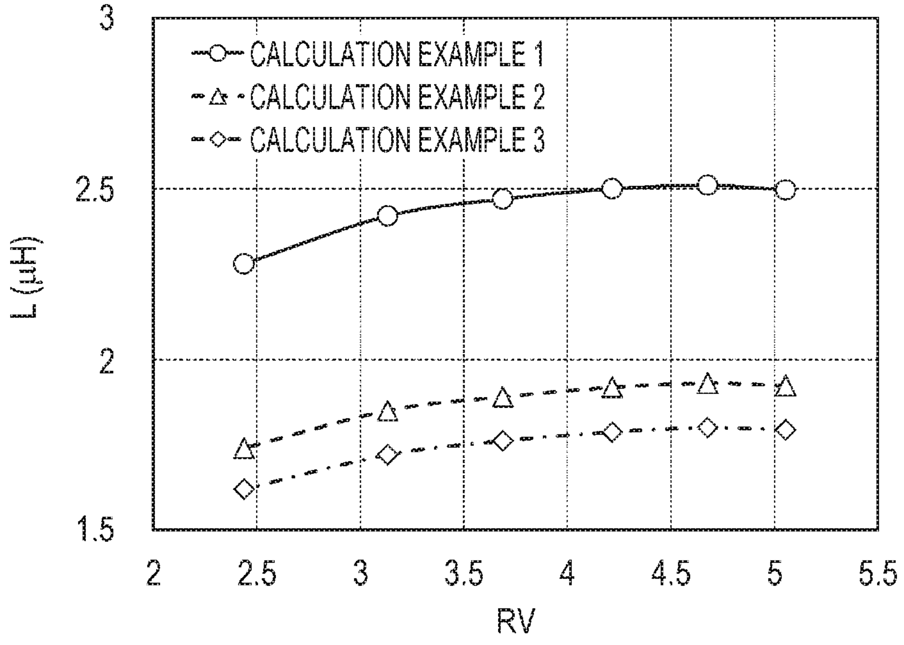
FIG. 6 is a graph showing the relationship between L and RV.

(Result 2) As illustrated in FIG. 6, the self-inductance L has a peak when the inner core volume ratio RV is about 4.5. As a general tendency, due to the influence of the material constituting the dust core 30, the self-inductance L of calculation example 1 is higher than the self-inductance L of calculation example 2, and the self-inductance L of calculation example 2 is higher than the self-inductance L of calculation example 3.

Figure 7:
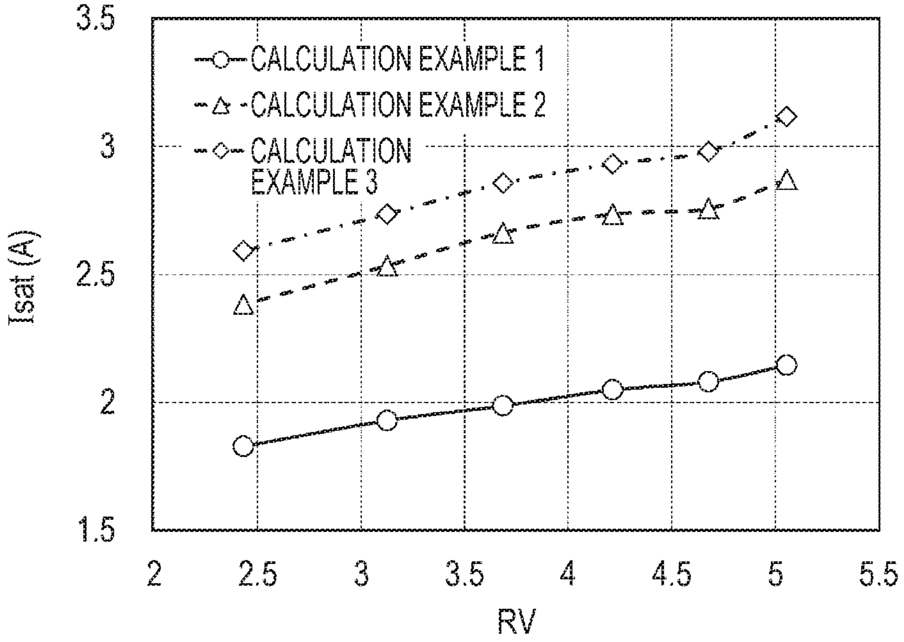
FIG. 7 is a graph showing the relationship between Isat and RV.

(Result 3) As illustrated in FIG. 7, the Isat (DC superposition characteristics) increases roughly linearly with respect to the inner core volume ratio RV, but shows less linearity than the case of the DC resistance component DCR. As a general tendency, due to the influence of the material constituting the dust core 30, the Isat of calculation example 1 is lower than Isat of calculation example 2, and the Isat of calculation example 2 is lower than the Isat of calculation example 3.

Figure 8:
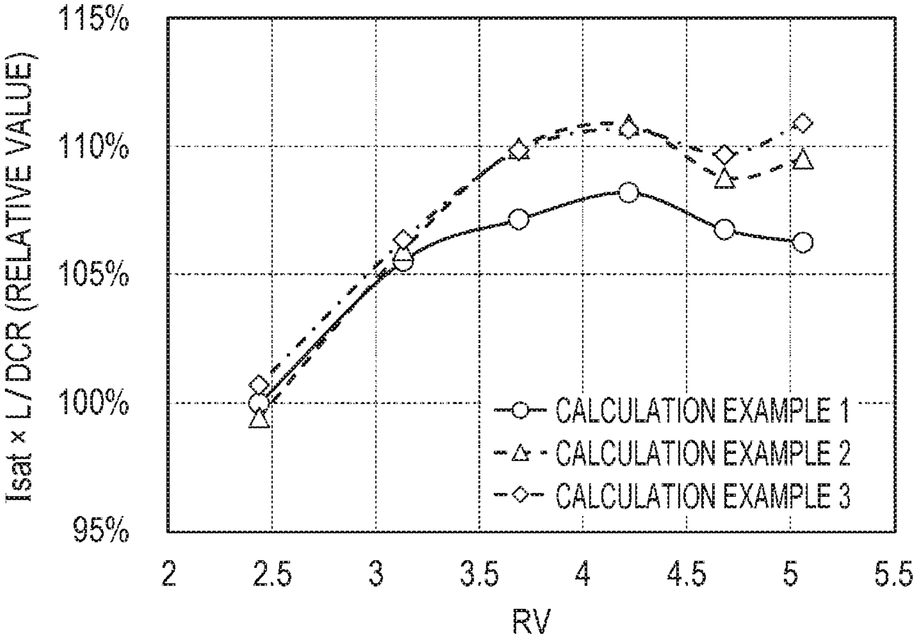
FIG. 8 is a graph showing the relationship between Isat×L/DCR and RV.

(Result 4) as illustrated in FIG. 8, the comprehensive evaluation, Isat×L/DCR, increases with the inner core volume ratio RV but tends to peak at about an RV of 4. In addition, it has become clear that, at an inner core volume ratio RV exceeding 5, Isat×L/DCR may decrease in some cases. In FIG. 8, the longitudinal axis indicates the relative value based on the result of calculation example 1-6 regarding Isat×L/DCR. As is apparent from FIG. 8, it was confirmed that by setting the inner core volume ratio RV to 3 or more and 5 or less, the basic characteristics and the DC superposition characteristics of the inductance element 100 can be comprehensively improved. Furthermore, it was confirmed that when the inner core volume ratio RV is low, specifically, 3 or less, the material constituting the dust core 30 has a little influence on the comprehensive evaluation Isat×L/DCR, but when the inner core volume ratio RV is high, specifically, more than 3, the material constituting the dust core 30 has a notable influence on the comprehensive evaluation Isat×L/DCR. Note that in the aforementioned simulation, an edgewise coil that used a rectangular wire was used; however, it was confirmed that similar results were obtained from an α-coil that used the same rectangular wire.

An electric or electronic device according to one embodiment of the present invention has the inductance element 100 according to one embodiment of the present invention mounted thereto, and is connected to a substrate via connecting terminals (application-type electrodes 40 and 45) coupled to the respective end portions (terminals 20 and 25) of the coil 10 of the coil-embedded dust core 100A. Since the electric or electronic device according to one embodiment of the present invention has the inductance element 100 according to one embodiment of the present invention mounted thereto, downsizing of the device is easy. Moreover, even when a large current is supplied to the device or a high frequency is applied to the device, failures caused by function degradation of the inductance element 100 or heat generation rarely occur.

The embodiments described heretofore are for promoting the understanding of the present invention, not limiting the present invention. Thus, the elements disclosed in the aforementioned embodiments are intended to include all design modifications and equivalents belonging to the technical scope of the present invention.

The inductance element equipped with the coil-embedded dust core of the present invention is suitable for use as a component for driving a display unit of a smart phone, or the like.

What is claimed is:

1. A coil-embedded dust core comprising:

a dust core containing a magnetic powder; and a coil embedded in the dust core, the coil having a winding axis along a first direction and a winding body wound around the winding axis, the dust core including a first region located on an inner side of the winding body and a second region located on an outer side of the winding body viewed from the first direction, wherein the coil-embedded dust core has an inner core volume ratio RV defined as:

RV=(V1/V2)/(1−V/Vp), which is equal to or greater than 3 and equal to or smaller than 5, where V1 represents a volume of the first region of the dust core, V2 represents a volume of the second region of the dust core, V represents a volume of the dust core, and Vp represents a volume of the coil-embedded dust core.

2. The coil-embedded dust core according to claim 1, wherein at least a portion of the magnetic powder includes an amorphous magnetic material.

3. The coil-embedded dust core according to claim 2, wherein the magnetic powder includes the amorphous magnetic material and a crystalline magnetic material.

4. The coil-embedded dust core according to claim 3, wherein the crystalline magnetic material contains at least one material selected from the group consisting of Fe—Si—Cr alloys, Fe—Ni alloys, Fe—Co alloys, Fe—V alloys, Fe—Al alloys, Fe—Si alloys, Fe—Si—Al alloys, carbonyl iron, and pure iron.

5. The coil-embedded dust core according to claim 4, wherein the crystalline magnetic material includes an Fe—Si—Cr alloy.

6. The coil-embedded dust core according to claim 2, wherein the amorphous magnetic material contains at least one material selected from the group consisting of Fe—Si—B alloys, Fe—P—C alloys, and Co—Fe—Si—B alloys.

7. The coil-embedded dust core according to claim 6, wherein the amorphous magnetic material includes an Fe—P—C alloy.

8. An inductance element comprising:

the coil embedded dust core according to claim 1; and connecting terminals respectively coupled to end portions of the coil of the coil-embedded dust core.

9. An electric or electronic device comprising:

the inductance element according to claim 8 mounted thereon, wherein the inductance element is connected to a substrate of the electric or electronic device via the connecting terminals.

* * * * *